May 31, 1927.  
C. H. WILLS  
1,630,554
OIL FEED CONSTRUCTION
Filed Nov. 6, 1920
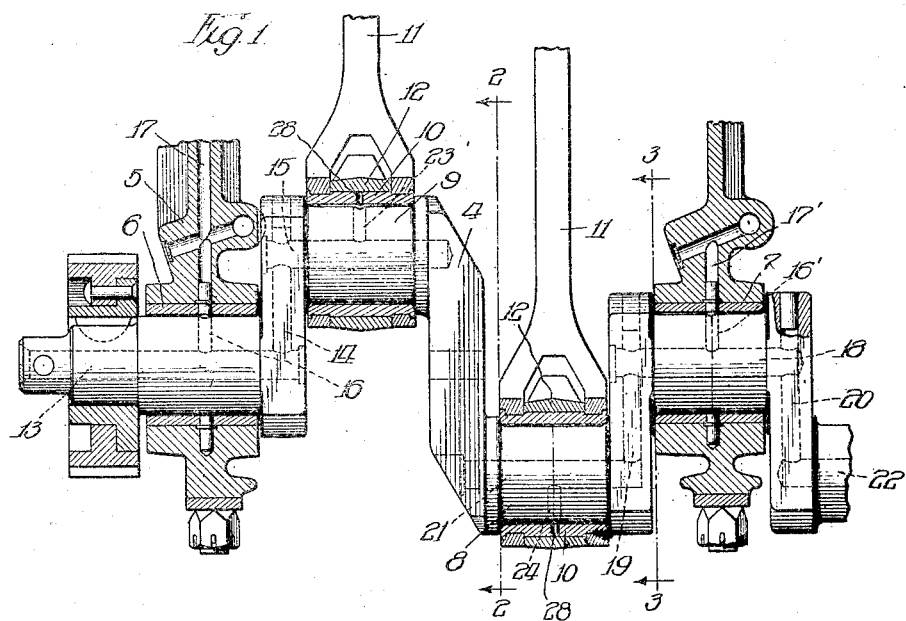
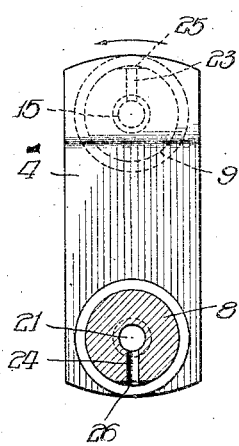
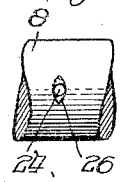
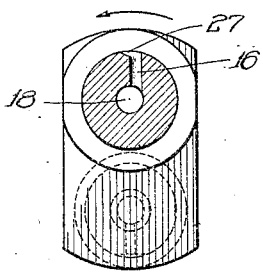
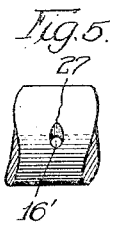
Witness:
R. Burkhardt.
Inventor:
C. Harold Wills,
By Wilkinson, Huxley, Byron & Knight.
attys.

Patented May 31, 1927.

1,630,554

UNITED STATES PATENT OFFICE.

CHILDE HAROLD WILLS, OF MARYSVILLE, MICHIGAN.

OIL-FEED CONSTRUCTION.

Application filed November 6, 1920. Serial No. 422,160.

This invention relates to a new and improved means and method of feeding lubricating oil from a bearing to a rotating shaft. More specifically it relates to a more efficient form of oil receiving cavity and location of oil passage in a crank shaft adapted to receive the oil from a crank case bearing for transmission through the shaft to a connecting rod bearing.

In lubricating systems including oil passages in the crank shaft, oil must be fed to the crank case bearing under relatively heavy pressure. This is due to the fact that in order to pass into and through the radial passage in the crank shaft, the pressure must be sufficient to overcome the centrifugal force imparted by the rotation of the shaft to oil in the passage. The oil then passes through an axial passage or passages to radial passages or channels and thence to the connecting rod bearings on the crank shaft. This latter movement of the oil is assisted by the centrifugal force and hence the outlet passages and openings do not involve the same problem as do the intake portions.

It is an object of the present invention to enable the feed of oil to the crank case bearings of a shaft or a similar rotating part and into oil passages in the shaft or part to be maintained in a constantly sufficient volume with a relatively low constant oil pressure, or to enable the flow of oil to be increased over that secured in the customary passages without an increase of the usual oil pressure. It is an object to provide oil receiving cavities or scuppers upon the rotating member associated with the oil passages therein in such manner as to assure a free and positive feed of oil to the passages. It is also an object to provide oil passages so located in the cross section of the rotative member and relative to the center of rotation thereof that the centrifugal effect upon oil in the passages is minimized or eliminated. It is a further object to provide scuppers and passages of the character described which may be readily formed in the crank shaft or similar rotating member by usual machine processes whereby ease and cheapness of manufacture are facilitated. Other and further objects will appear as the description proceeds.

More specifically my invention involves the formation of intake passages in the rotating member along a chord of the cross section thereof and the provision of semi-elliptic cavities or scuppers in communication with the outer end of the passages, the rear wall of the scuppers considered relative to the direction of rotation of the member, being preferably coincident with the rear wall of the passage. The intake passage is preferably so located that its intake opening is located in the rear of a diameter of the member drawn parallel to the passage, or if not a straight passage, the passage should be located rearwardly of a diameter intersecting the forward edge of the opening of the passage upon the outer face of the member.

I have illustrated a preferred embodiment of my invention in the accompanying drawings in which—

Figure 1 is a longitudinal view of part of a crank shaft with portions of the associated bearings and connecting rods shown therewith;

Figure 2 is a section taken on line 2—2 of Figure 1;

Figure 3 is a section taken on line 3—3 of Figure 1;

Figure 4 is a fragmentary plan view showing the scupper of Figure 2; and,

Figure 5 is a view similar to Figure 4 showing the scupper of Figure 3.

The crank shafts and piston rods, as shown, are adapted for use in a V-type motor. The crank shaft 4 is supported in the crank case 5 upon the forward bearing 6 and the intermediate bearing 7. The crank portions 8 and 9 of the crank shaft each carry a bushing 10 and a pair of connecting rods 11 and 12. The rod 11 has its lower end bifurcated to permit the lower end of the rod 12 to be placed between the bifurcated portions. The forward portion of the crank shaft is provided with the axial passage 13 which communicates with a radial passage 14, this in turn connecting with a passage 15 which is located axially of the crank portion 9 of the crank shaft. The passage 13 is intersected by a channel 16 which extends to the upper surface of the shaft. An oil channel is provided in the bearing 6 in registration with the opening of the channel 16 and an oil passage 17 extends downwardly through the crank case 5 with its lower end in communication with the channel in the bearing. An axial passage 18 extends through the portion of the crank shaft supported by the bearing 7 and it communicates with the passages 19 and 20, which in turn communicate with passages 21 and 22 located axially of the adjacent crank portions of the crank shafts. Oil is fed to the passage 18 through channel 16' from the oil passage 17' in the crank case. Radial channels 23 and 24 lead outwardly from the passages 15 and 21 respectively to the bushings 10.

As shown in Figure 2, the radial channels 23 and 24 are provided with elliptical scuppers 25 and 26. The channel 16', as shown in Figure 3, is provided with the semi-elliptical scupper 27, one wall of the scupper being coincident with the adjacent wall of the channel 16'. As clearly shown in Figure 3, the channel 16' is located upon one side of a diameter taken through the crank shaft parallel to the channel.

Passages 28 extend outwardly through the bushings 10 to permit passage of the lubricant to the bearing of the rod 12 upon the bushing. The bushings are keyed to the rods 11 so that direct lubrication of their meeting surfaces is unnecessary.

In the operation of my oiling system, the oil will be passed downwardly through the passage 17 to the channel in the bearing 6. The crank shaft 4 will be rotated in the direction indicated by the arrow in Figure 3. Oil will be carried by pressure through the channel 16 to the passage 13. It will then be carried both by the pressure and by centrifugal force outwardly through the passage 14 and thence to the passage 15. From passage 15 it is carried to the adjacent bearing by the channel 23 and a portion of the flow is taken through the bushings 10 by the channels 28. The channel 16', passages 18, 19, 20, 21, and 22 and the channel 24 with its cooperating channel 28 operate in a manner similar to that just described. The full elliptic scuppers 26 at the ends of passages leading to bearings aid materially in distributing the lubricant to the bearing.

Due to the non-radial formation of the channel 16, the pressure of the oil feed system does not need to overcome centrifugal force to the same extent as would be necessary were the channel radial. In carrying the oil inwardly through that channel it will be noted that this channel is formed rearwardly relative to a diameter parallel thereto, the direction being referred to the direction of rotation of the crank shaft. This insures the assistance of centripetal force in the inward movement of the oil. The scupper 27 extending forwardly of the channel 16' is of material assistance in assuring the steady flow of oil to the channel and the rear of this scupper is substantially coincident with the rear wall of the channel 16 so that all oil intercepted by the scupper enters the channel.

It is obvious that the channels 16 and 16' may be formed curved in direction rather than straight with the same or greater efficiency of operation. For the purpose of economical manufacturing, however, the straight channel shown is the more desirable, the essential points being that it is non-radial in direction and is located rearwardly of a diameter intersecting the forward portion of its opening upon the outer surface of the member.

It will be apparent that my construction permits the usual flow of oil with a smaller oil feed pressure, or permits an increased flow with the same pressure where the channels are similar in size. Or on the other hand, if the pressure is maintained the same, smaller oil passages and channels may be used without loss of oil flow. These smaller channels lessen the weakening of the crank shaft necessitated by the formation of the channels and hence are a highly desirable construction.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. A rotating member, a bearing therefor, said member having an oil passage therein and having a channel communicating with said passage upon a chord of the circle of said member extending between the exterior of the member and said passage.

2. A rotating member, a bearing therefor, said member having a cylindrical oil passage therein and having a channel communicating with said passage upon a chord of the cross section of said passage extending between the latter and the exterior of said member.

3. A rotating member, a bearing therefor, an oil passage in said member, a channel extending inwardly from the outer surface of the member to said passage, the channel being located upon one side of a diameter of the member intersecting one edge of the outer opening of the channel.

4. A rotating member, a bearing therefor, an oil passage in said member, a channel extending inwardly from the outer surface of the member to said passage, the channel being located upon the rearward side of a diameter of the member intersecting the forward edge of the outer opening of the channel, the direction being considered relative to the direction of rotation of the member.

5. A rotating member, a bearing therefor, a channel extending inwardly from the outer surface of the member, the channel being located upon one side of a diameter of the member intersecting one edge of the outer opening of the channel and an oil passage in the member connecting with the channel.

6. A rotating member, a bearing therefor, a channel extending inwardly from the outer surface of the member, the channel being located upon one side of a diameter of the member intersecting one edge of the outer opening of the channel, and an axially extending oil passage in the member intersecting the channel.

7. A rotating member, a bearing therefor, a channel extending inwardly from the outer surface of the member, the channel being located upon the rearward side of a diameter of the member intersecting the forward edge of the outer opening of the channel, the direction being considered relative to the direction of rotation of the member, the inner end of the channel intersecting an axially extending oil passage concentric with the rotating member.

8. A rotating member, a bearing therefor, and oil channel extending into said rotating member and a semi-elliptic scupper upon the member communicating with the oil channel.

9. A rotating member, a bearing therefor, an oil channel extending into said rotating member and a scupper upon the member communicating with the oil channel, the rear portion of the scupper wall relative to the direction of rotation of the member being coincident with the rear wall of the channel.

10. A rotating member, a bearing therefor, an oil channel extending into said rotating member and a scupper upon the member communicating with the oil channel, the rear portion of the scupper wall relative to the direction of rotation of the member being coincident with the rear wall of the channel, the bearing having an oil channel with which the scupper and channel opening register.

11. A rotating member, a bearing therefor, an oil channel extending into said rotating member and a scupper upon the member communicating with the oil channel, the scupper being semi-elliptic in form with its longer axis coincident with the line of the direction of rotation of the member.

12. A rotating member, a bearing therefor, a channel extending inwardly from the outer surface of the member, the channel being located upon one side of a diameter of the member intersecting one edge of the outer opening of the channel, and a scupper associated with the outer opening of the channel, the scupper being semi-elliptic in form with its longer axis coincident with the line of the direction of rotation of the member.

Signed at Marysville, Michigan, this 19th day of October, 1920.

CHILDE HAROLD WILLS.